US010924652B2

(12) United States Patent
Cha et al.

(10) Patent No.: US 10,924,652 B2
(45) Date of Patent: Feb. 16, 2021

(54) MONITORING APPARATUS AND MONITORING SYSTEM

(71) Applicant: Hanwha Techwin Co., Ltd., Seongnam-si (KR)

(72) Inventors: Yoo Mi Cha, Seongnam-si (KR); Kyoung Jeon Jeong, Seongnam-si (KR); Dong Won Kim, Seongnam-si (KR); Sung Pil Chun, Seongnam-si (KR); Chang Hee Song, Seongnam-si (KR); Mi Na Choi, Seongnam-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 0 days.

(21) Appl. No.: 16/207,746

(22) Filed: Dec. 3, 2018

(65) Prior Publication Data
US 2019/0104254 A1    Apr. 4, 2019

Related U.S. Application Data

(63) Continuation of application No. PCT/KR2016/006877, filed on Jun. 28, 2016.

(30) Foreign Application Priority Data

Jun. 2, 2016  (KR) ........................ 10-2016-0069056

(51) Int. Cl.
*H04N 5/232*     (2006.01)
*H04N 5/357*     (2011.01)
(Continued)

(52) U.S. Cl.
CPC ....... *H04N 5/23203* (2013.01); *G06T 3/0018* (2013.01); *G06T 7/80* (2017.01);
(Continued)

(58) Field of Classification Search
CPC ..... G06T 7/80; G06T 3/0018; H04N 5/23238; H04N 5/232933
See application file for complete search history.

(56) References Cited

U.S. PATENT DOCUMENTS

| 2002/0063802 | A1 | 5/2002 | Gullichsen et al. |
| 2004/0012538 | A1* | 1/2004 | Bhogal ................. G06F 3/1431 345/1.1 |

(Continued)

FOREIGN PATENT DOCUMENTS

| JP | 2005-86279 A | 3/2005 |
| JP | 5578011 B2 | 8/2014 |

(Continued)

OTHER PUBLICATIONS

International Search Report (PCT/ISA/210) dated Feb. 27, 2017 issued by the International Searching Authority in International Application No. PCT/KR2016/006877.
(Continued)

*Primary Examiner* — Lindsay J Uhl
(74) *Attorney, Agent, or Firm* — Sughrue Mion, PLLC

(57) ABSTRACT

A monitoring apparatus includes: a communication interface configured to receive an original image acquired by a camera; a storage configured to store the original image; a display configured to display the original image and a calibrated image obtained by dewarping the original image; and a controller configured to control operations of the communication interface, the storage, and the display, wherein, in a view mode in which only the calibrated image among the original image and the calibrated image is displayed, in response to the calibrated image being selected, the display is configured to display a mini map which shows the original image in a portion of the selected calibrated image.

19 Claims, 11 Drawing Sheets

(51) Int. Cl.
*H04N 7/18* (2006.01)
*G06T 7/80* (2017.01)
*G06T 3/00* (2006.01)

(52) U.S. Cl.
CPC ..... *H04N 5/23216* (2013.01); *H04N 5/23238* (2013.01); *H04N 5/232933* (2018.08); *H04N 5/3572* (2013.01); *H04N 7/183* (2013.01)

(56) References Cited

U.S. PATENT DOCUMENTS

| | | |
|---|---|---|
| 2006/0158462 A1 | 7/2006 | Toyama et al. |
| 2006/0274067 A1 | 12/2006 | Hidai |
| 2008/0218587 A1* | 9/2008 | Glatt ................ G03B 37/00 348/39 |
| 2011/0187750 A1* | 8/2011 | Ko .................... G09G 5/00 345/661 |
| 2012/0162357 A1* | 6/2012 | Okegawa ......... H04N 5/23238 348/36 |
| 2013/0293672 A1* | 11/2013 | Suzuki ............. H04N 5/23238 348/36 |
| 2014/0002440 A1* | 1/2014 | Lynch .................. G06T 19/00 345/419 |
| 2014/0184646 A1* | 7/2014 | Liu ..................... G06T 11/00 345/634 |
| 2016/0119551 A1* | 4/2016 | Brown ................ G06T 3/0062 345/646 |
| 2016/0132991 A1* | 5/2016 | Fukushi ............. A63F 13/5255 345/667 |

FOREIGN PATENT DOCUMENTS

| | | |
|---|---|---|
| KR | 10-0991104 B1 | 11/2010 |
| WO | 2010/114337 A2 | 10/2010 |

OTHER PUBLICATIONS

Written Opinion (PCT/ISA/237) dated Feb. 27, 2017 issued by the International Searching Authority in International Application No. PCT/KR2016/006877.

* cited by examiner

MONITORING APPARATUS AND MONITORING SYSTEM

CROSS-REFERENCE TO THE RELATED APPLICATION

This application is a continuation of International Application No. PCT/KR2016/006877, which was filed on Jun. 28, 2016, and claims priority from Korean Patent Application No. 10-2016-0069056, which was filed in the Korean Intellectual Property Office on Jun. 2, 2016, the disclosures of which are incorporated herein by reference in their entireties.

BACKGROUND

Apparatuses and methods consistent with exemplary embodiments relate to a monitoring apparatus and monitoring system capable of displaying a calibrated image in a large size and displaying an original image as a mini map when desired by a user so that monitoring is performed with a greater focus on the calibrated image.

Generally, surveillance systems are widely used in various places including banks, department stores, and residential areas. These surveillance systems may be used for crime prevention and security purposes, but in recent years, the surveillance systems have also been used for real-time monitoring of pets or children indoors. A system that is most commonly used as such surveillance system is a closed circuit television (CCTV) system which has a camera installed in a proper position to capture a desired region and which allows a user to perform surveillance by monitoring an image captured by the camera.

However, in the case of a general front camera, due to a limited range of an angle of view, it is easy to miss an object to be monitored when the object to be monitored moves and deviates from the angle of view. Even if the camera provides pan, tilt, and zoom (PTZ) functions, the user has to directly manually give an order, or even if the camera automatically performs the PTZ functions, it is very likely that the camera will miss an object to be monitored when the object to be monitored moves quickly.

Therefore, in recent years, the use of surveillance systems capable of performing surveillance using an omnidirectional camera such as a fisheye camera has increased rapidly. The fisheye camera is a camera equipped with a fisheye lens having a wide angle of view of about 180°, and there is even a fisheye lens having an angle of view much larger than 180°. In addition, in recent years, a 360° camera, in which such two fisheye lenses are mounted to face each other such that the camera is able to capture images in all directions without having to pan or tilt, has also been introduced. Using a fisheye lens is very effective in a surveillance system since the fisheye lens reduces a blind spot of the camera and prevents missing of an object to be monitored.

With the development of technologies related to a fisheye lens, people's interests in a method of monitoring an image captured by a fisheye camera have also been increased. An original image of a fisheye image captured and acquired by a fisheye camera has an advantage in that it has a wide angle of view but has a disadvantage in that it is not optimized for a human vision system, and thus, it is inconvenient for a user to perform monitoring. To address this problem, it is necessary to generate a calibrated image by dewarping the original image in order to optimize the original image for the human vision system.

Since a calibrated image shows a specific region in detail, when an event occurs, the calibrated image facilitates a detailed observation of the event. In addition, since an original image has a wide angle of view, when the event occurs, the original image facilitates identification of a position at which the event has occurred. Therefore, generally, an original image and a calibrated image are displayed together in many cases.

Information disclosed in this Background section has already been known to the inventors before achieving the disclosure or is technical information acquired in the process of achieving the disclosure. Therefore, it may contain information that does not form the prior art that is already known to the public.

SUMMARY

Exemplary embodiments of the inventive concept provide a monitoring apparatus capable of more effectively monitoring an image captured and acquired by an omnidirectional camera such as a fisheye camera.

The exemplary embodiments also provide a monitoring system that allows a user to intuitively check the relationship between an original image and a calibrated image of the fisheye image and is easy to use so that user convenience is enhanced.

According to an exemplary embodiment, there is provided a monitoring apparatus which may include: a communication interface configured to receive an original image acquired by a camera; a storage configured to store the original image; a display configured to display the original image and a calibrated image obtained by dewarping the original image; and a controller configured to control operations of the communication interface, the storage, and the display, wherein, in a view mode in which only the calibrated image among the original image and the calibrated image is displayed, in response to the calibrated image being selected, the display is configured to display a mini map which shows the original image in a portion of the selected calibrated image.

According to an exemplary embodiment, there is provided a monitoring apparatus which may include: a communication interface configured to receive an original image acquired by an omnidirectional camera having an angle of view greater than or equal to 180°; and a controller configured to control a display to display the original image and at least one calibrated image obtained by dewarping the original image on a screen of a display in a plurality of view modes, wherein the view modes include a first view mode in which the original image and the calibrated image are displayed on a screen of the display at the same time, and, in the original image displayed on the screen, a region of the original image, corresponding to the calibrated image, is visibly divided from the other regions of the original image.

According to embodiments, there are at least the following effects.

A monitoring apparatus and monitoring system according to the embodiments allow a user to intuitively check the relationship between an original image, which is captured and acquired by a fisheye camera, and a calibrated image, thereby allowing more effective monitoring.

Advantageous effects according to the present invention are not limited to those mentioned above, and various other advantageous effects are included herein.

DETAILED DESCRIPTION

Figure 1:
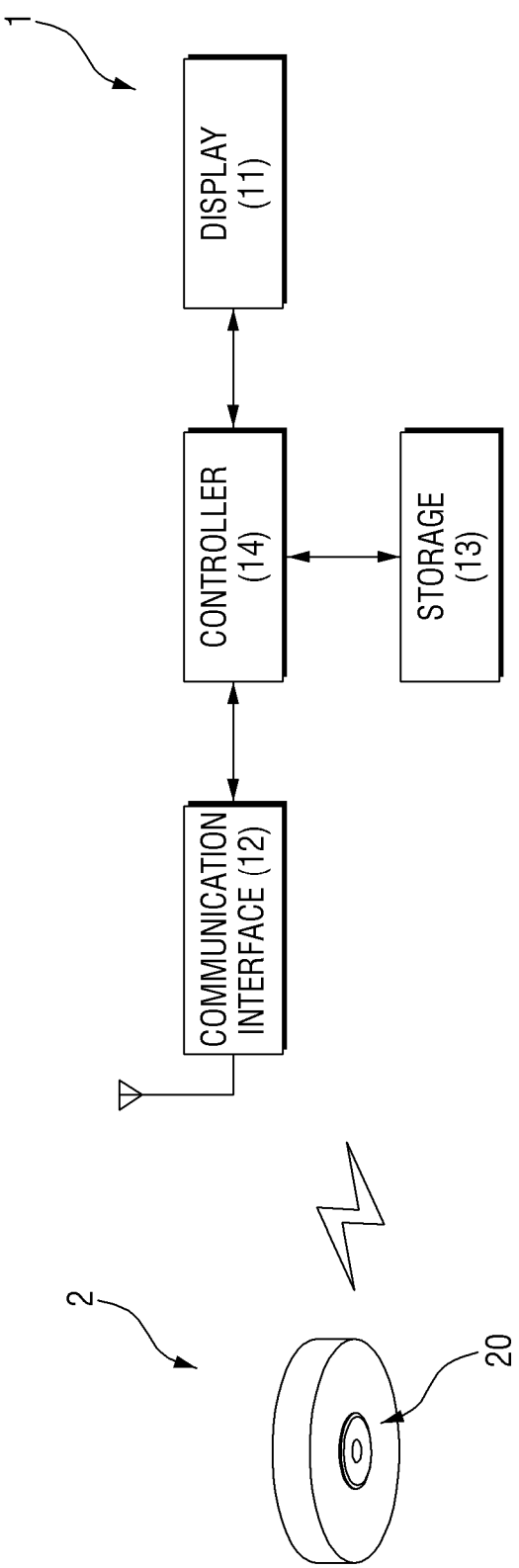
FIG. 1 is a block diagram illustrating a configuration of a monitoring system according to an embodiment.

Advantages and features of the inventive concept and a method of achieving the same should become clear with the embodiments described in detail below with reference to the accompanying drawings. The embodiments described herebelow are all exemplary, and thus, the inventive concept is not limited to these embodiments disclosed below and may be realized in various other forms. These embodiments make the disclosure of the inventive concept complete and are provided to completely inform one of ordinary skill in the art to which the embodiments pertain. The inventive concept is defined only by the scope of the claims. Like reference numerals refer to like elements throughout.

Unless otherwise defined, all terms including technical and scientific terms used herein have the same meaning as commonly understood by one of ordinary skill in the art to which the embodiments pertain. Terms, such as those defined in commonly used dictionaries, are not to be construed in an idealized or overly formal sense unless expressly so defined herein.

Terms used herein are for describing the embodiments and are not intended to limit the inventive concept. A singular expression includes a plural expression unless the context clearly indicates otherwise. The terms "comprises" and/or "comprising" used herein do not preclude the existence or the possibility of adding one or more elements other than those mentioned.

Hereinafter, the embodiments inventive concept will be described in detail with reference to the accompanying drawings.

Figure 2:
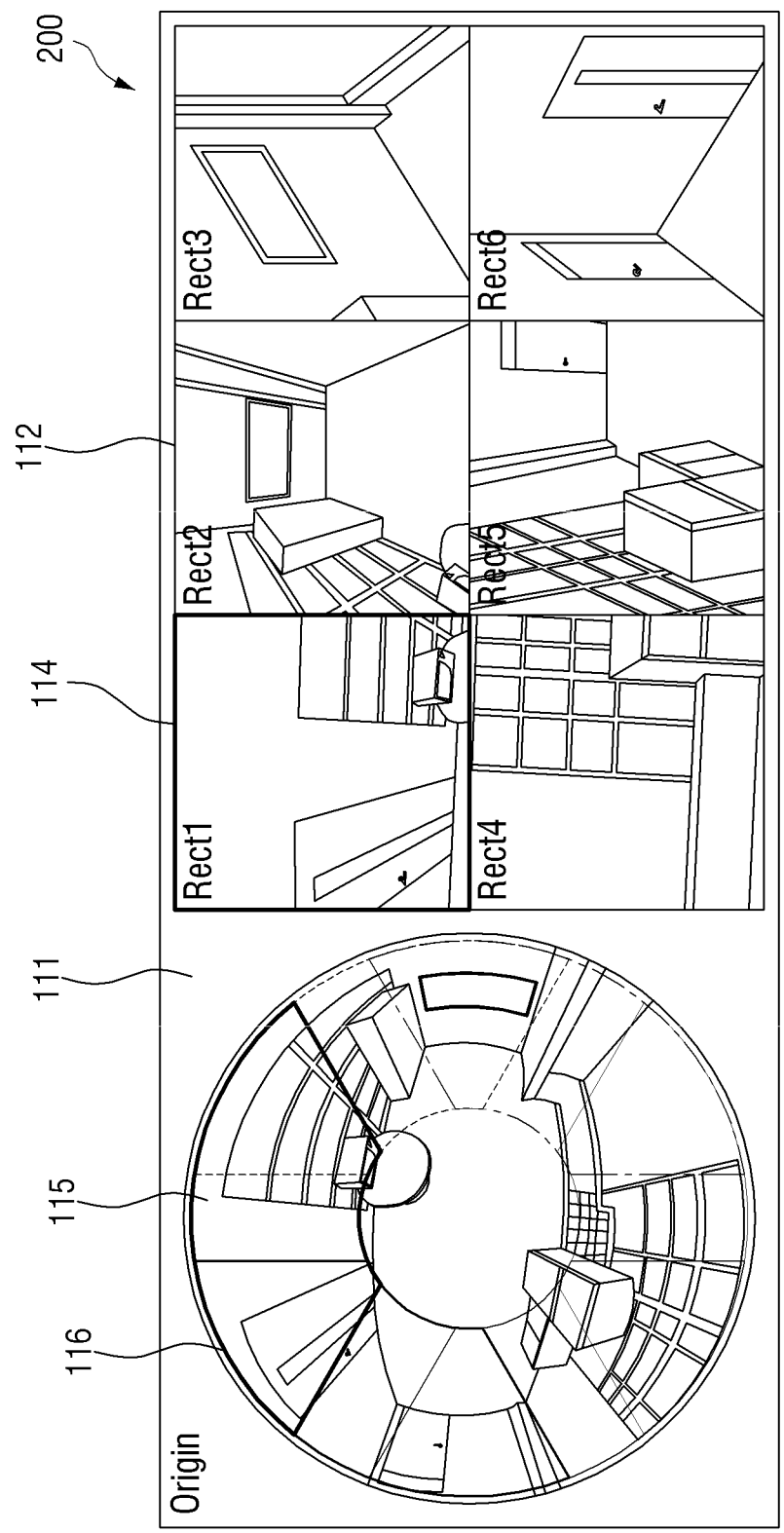
FIG. 2 is a view illustrating a general state in which an original image, which is captured by a fisheye camera, and calibrated images are displayed on a display of a monitoring apparatus, according to an embodiment.
Figure 3:
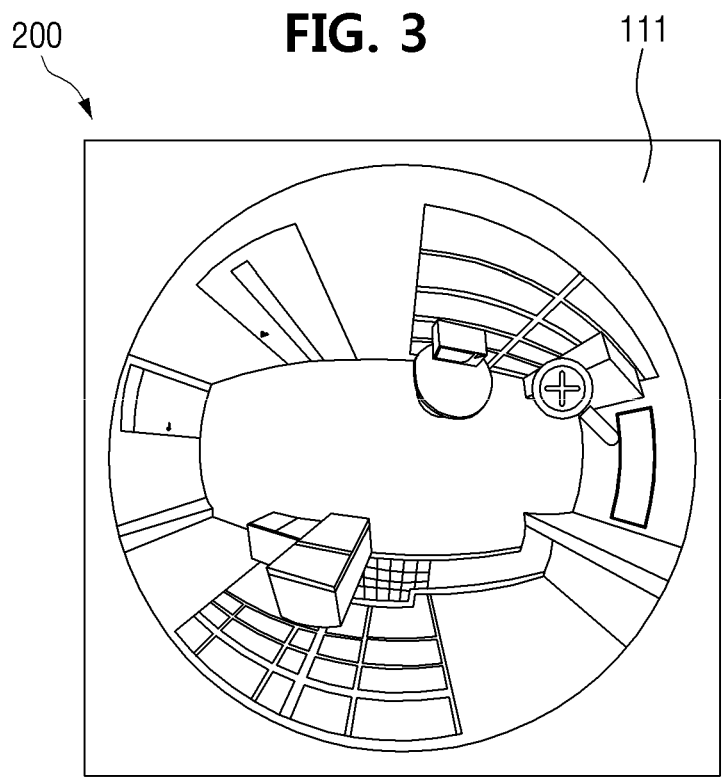
FIG. 3 is a view illustrating a state in which only an original image is displayed on a display, according to an embodiment.
Figure 4:
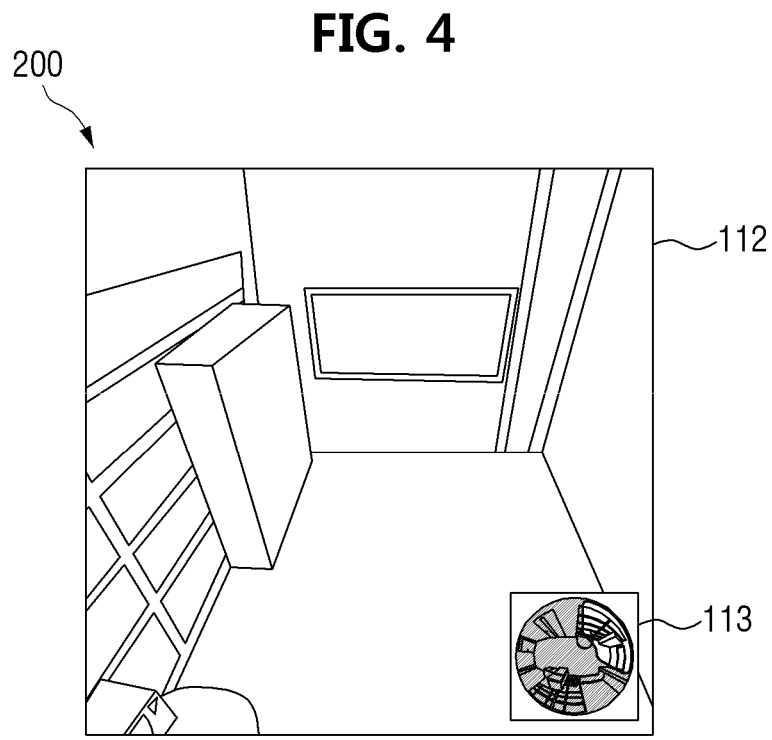
FIG. 4 is a view illustrating a state in which the original image of FIG. 3 is enlarged, according to an embodiment.

FIG. 1 is a block diagram illustrating a configuration of a monitoring system according to an embodiment. FIG. 2 is a view illustrating a general state in which an original image, which is captured by a fisheye camera, and a calibrated images are displayed on a screen of a display of the monitoring apparatus, according to an embodiment. FIG. 3 is a view illustrating a state in which only an original image is displayed on a display of the monitoring apparatus, according to an embodiment. FIG. 4 is a view illustrating a state in which the original image of FIG. 3 is enlarged.

Referring to FIG. 1, a monitoring system according to an embodiment includes a camera 2 configured to capture a specific region and acquire an image, and The monitoring system further includes a monitoring apparatus 1 configured to receive the image acquired by the camera 2 and display the image. The camera 2 and the monitoring apparatus 1 may be connected to each other via a wire or wirelessly to transmit and receive image data or signals to and from each other.

The camera 2 according to an embodiment is an omnidirectional camera such as a fisheye camera 2 having a fisheye lens 20, and an image acquired by the fisheye camera 2 is an original image 111 as shown in FIG. 2. Image processing such as encoding, decoding, and rendering may be performed on the original image 111 for the original image 111 to be displayed on the monitoring apparatus 1, but a dewarping task in which distortion is calibrated is not performed thereon.

The monitoring apparatus 1 receives an image acquired by the camera 2 and displays the image. An original image 111 and a calibrated image 112 which is obtained by dewarping the original image 111 may be displayed together on the monitoring apparatus 1. The monitoring apparatus 1 may be an apparatus that is portable and mobile such as a smartphone, a tablet personal computer (PC), and a laptop, but is not limited thereto, and may also be an apparatus that is not mobile such as a desktop and a video wall.

As illustrated in FIG. 1, the monitoring apparatus 1 includes a display 11 configured to display an image on a screen 200 included in the display 11, a communication interface 12 configured to receive an image from the camera 2, a storage 13 configured to store the image, and a controller 14 configured to control the other elements. In the embodiments described herein, the display 11 is a part of the monitoring apparatus 1. However, according to another embodiment, the display 11 may be provided separately from the monitoring apparatus 11.

The display 11 displays the original image 111 and the calibrated image 112 on the screen 200. In addition, a mini map 113 in which the original image 111 is roughly shown is displayed in the calibrated image 112 as shown in FIG. 4, and a polygon 116 of a dewarping region which corresponds to the calibrated image 112 is displayed in the original image 111 shown in the mini map 113. In addition, the display 11 provides various view modes for displaying the original image 111 and the calibrated image 112 on the screen 200. The mini map 113, the polygon 116, and the view modes will be described in detail below.

The monitoring apparatus 1 may not provide a touch function, and in this case, an input interface is separately provided. Generally, an input interface that is most commonly used includes a mouse, a keyboard, a joystick, and a remote controller. If the monitoring apparatus 1 provides the touch function, the display 11 may include a touch sensor capable of detecting a touch input on the screen 200. Even if the monitoring apparatus 1 provides the touch function, a separate touch pad may be provided as an input interface when the display 11 does not include a touch sensor. In addition, a touch may be made using a finger, but embodiments are not limited thereto, and a touch may also be made using a stylus pen or the like having a tip through which microcurrent may flow.

The communication interface 12 transmits and receives signals or data to and from the camera 2 via a wire or wirelessly. For example, the communication interface 12 transmits signals or data received from the controller 14 by performing modulation and frequency up-conversion thereof, or provides signals or data received from the camera 2 to the controller 14 by performing frequency down-conversion and demodulation thereof. Through such a process, the communication interface 12 may receive image data or signals from the camera 2 or transmit signals or data generated from the controller 14 to the camera 2. Here, the communication interface 12 may include any one or any combination of a digital modem, a radio frequency (RF) modem, a WiFi chip, and related software and/or firmware.

The storage 13 stores programs for processing and controlling operations of the monitoring apparatus 1, various data generated during execution of each program, the original image 111 transmitted through the camera 2, and the calibrated image 112 which is obtained by dewarping the original image 111. The storage 13 may be embedded in the monitoring apparatus 1, but in the case of a network camera system, a separate device such as a network video recorder (NVR) may be provided as the storage 13.

The controller 14 controls the overall operation of the monitoring apparatus 1. For example, the controller 14 performs processing and control for signal or data communication between the communication interface 12 and the camera 2, and performs image processing such as decoding and rendering when an image is transmitted thereto through the communication interface 12. In addition, when a user command is input, the controller 14 processes the user command, controls the display 11 to display the mini map 113 and the polygon 116 on the screen 200, stores an image in the storage 13, and controls the stored image to be loaded. It is preferable to use a central processing unit (CPU), a micro controller unit (MCU), a digital signal processor (DSP), or the like as the controller 14 according to an embodiment, but the controller 14 is not limited thereto, and various logic operation processors may be used as the controller 14.

The camera 2 according to an embodiment uses the fisheye lens 20. The camera 2 may be various other types of cameras when the original image 111 is distorted, and there is a need to calibrate the original image 111 to some extent.

An image generated using the fisheye lens 20 provides a wide angle of view, but distortion of the image due to refraction progressively increases toward an edge region of the image which is away from an optical axis. Using an image having such a distorted form as it is may not be a problem in some cases, but in specific fields, there is a need to use a distorted image after calibrating the distorted image in many cases. Generally, calibration of a distorted original image 111 formed by the fisheye lens 20 as described above is referred to as "distortion calibration" or "dewarping." The dewarping is performed through a proper operation using parameters such as a focal length and an optical center position of the fisheye lens 20 according to a projection method used in the fisheye lens 20.

The original image 111 may be sent to the monitoring apparatus 1, and then, calibrated through software and/or a distortion calibration chip included inside the fisheye camera 2. When the original image 111 is dewarped by the camera 2 itself, there is no need to install software for dewarping in the monitoring apparatus 1 that receives an image from the camera 2. Therefore, when an image is sent from a single camera 2 to several monitoring apparatuses 1, since dewarping is possible even if software is not installed in all of the monitoring apparatuses 1, a calibrated image 112 may be displayed immediately. According to an embodiment, an original image 111 may be dewarped to be a calibrated image 112 through software in the monitoring apparatus 1, but the camera 2 may perform the dewarping task by itself.

FIG. 2 illustrates a general state in which the original image 111, which is captured by the fisheye camera 2, and the calibrated images 112 are displayed on the screen 200 of the display 11 of the monitoring apparatus 1.

Generally, a viewer program is installed in the monitoring apparatus 1 for the original image 111 and the calibrated images 112 to be displayed on the screen 200 of the display 11. In addition, such a viewer program provides various view modes. The view modes refer to various methods capable of displaying a plurality of images. A user may select one of the various view modes to view the original image 111 or the calibrated images 112.

For example, as illustrated in FIG. 2, in a single view mode, the original image 111 is displayed at the left side while the plurality of calibrated images 112 are displayed at the right side. The calibrated images 112 are displayed by specific regions of the original image 111 being dewarped. Therefore, when there are a plurality of calibrated images 112, there are also a plurality of dewarping regions 115 corresponding to the calibrated images 112. Although the calibrated images 112 are illustrated as six separate images, which are six calibrated images 112, in FIG. 2, various other numbers of calibrated images 112 such as four separate images or nine separate images may be displayed in other view modes. Alternatively, in still another view mode, only the original image 111 may be displayed without the calibrated images 112. In yet another view mode, only the calibrated images 112 may be displayed without the original image 111, and even in this case, various numbers of calibrated images 112 such as four separate images, six separate images, or nine separate images may be displayed. That is, various view modes may be present without limitations as long as the view modes may be supported by a viewer program.

Since a calibrated image shows a specific region in detail, when an event occurs, the calibrated image facilitates a detailed observation of the event. In addition, since an original image has a wide angle of view, when the event occurs, the original image facilitates identification of a position at which the event has occurred. Therefore, generally, as illustrated in FIG. 2, an original image and a calibrated image are displayed together in many cases. However, when an event occurs, while the user only needs to identify a position at which the event has occurred through an original image, the user has to observe contents of the event in detail through a calibrated image, and thus, the user is able to perform monitoring with a greater focus on the calibrated image. Therefore, the importance of the original image and the importance of the calibrated image become different. However, when the user performs monitoring in the view mode illustrated in FIG. 2, the calibrated images in which the user is more interested are displayed in a small size while the original image is displayed in a large size.

In addition, when the original image 111 and the calibrated images 112 are displayed together, as illustrated in FIG. 2, a polygon 116 which indicates a dewarping region 115 corresponding to a calibrated image 112 is displayed in the original image. In this case, the color of lines may be set to be different for each polygon 116, and the color of a border 114 surrounding a calibrated image 112 may also be set to be different for each calibrated image 112. In addition, the color of a polygon 116 and the color of a border 114 of a calibrated image 112 corresponding to a dewarping region 115 that the polygon 116 surrounds may be matched to allow the user to easily check the calibrated image 112 and the dewarping region 115 corresponding thereto.

FIG. 3 illustrates a state in which only the original image 111 is displayed on the screen 200 of the display 11 according to an embodiment.

As described above, the display 11 according to an embodiment provides various view modes. In a view mode in which only the original image 111 is displayed, the original image 111 is displayed as illustrated in FIG. 3.

The user may enlarge the original image 111 to monitor a specific region of the original image 111 in detail. If the user is able to input a command in the monitoring apparatus 1 through a mouse, the user may enlarge the original image 111 by scrolling a mouse wheel upward. Alternatively, although not illustrated, if a plurality of separate menus is provided and an Enlarge menu is selected therefrom, the original image 111 may be enlarged each time the mouse is clicked. When the original image 111 is being enlarged, as illustrated in FIG. 3, a mouse cursor may have the shape of a magnifier instead of the shape of an arrow. This is to inform the user of the fact that the monitoring apparatus 1 is currently performing the function of enlarging the original image 111.

If the monitoring apparatus 1 provides a touch function, the user may enlarge the original image 111 by performing a touch input.

FIG. 4 illustrates a state in which the original image 111 of FIG. 3 is enlarged.

According to an embodiment, when the user enlarges the original image 111 with respect to a particular region where an input interface such as a mouse indicates, an enlarged region shown on the screen 200 of the display 11 serves as the dewarping region 115. The dewarping region 115 refers to a region corresponding to the calibrated image 112 within the original image 111. Specifically, when the original image 111 is dewarped and the calibrated image 112 is generated, the original image 111 is not generated as a single calibrated image 112 as a whole. This is because the original image 111 and the calibrated image 112 have different angles of view. Therefore, only a partial region of the original image 111 is generated as the calibrated image 112, and such a partial region is referred to as the dewarping region 115. Therefore, by the user just enlarging the original image 111, the original image 111 is automatically dewarped and immediately generated as the calibrated image 112 as illustrated in FIG. 4.

Meanwhile, the mini map 113 in which the original image 111 is roughly shown is displayed at a lower end of one side of the calibrated image 112. In addition, in the original image 111 shown in the mini map 113, polygon 116 formed to surround the dewarping region 115 may be displayed. Therefore, the user may simultaneously monitor the original image 111 and the calibrated image 112.

The calibrated image 112 of FIG. 4 is an image that has been automatically dewarped by enlarging the original image 111 as described above. Therefore, although not illustrated, if the calibrated image 112 of FIG. 4 is reduced, the calibrated image 112 may return to the original image 111 of FIG. 3. If the user is able to input a command in the monitoring apparatus 1 through a mouse, the user may reduce the calibrated image 112 by scrolling a mouse wheel downward. Alternatively, if a plurality of separate menus is provided and a Reduce menu is selected therefrom, the calibrated image 112 may be reduced each time the mouse is clicked. When the calibrated image 112 is being reduced, a mouse cursor may have the shape of the magnifier instead of the shape of an arrow. If the monitoring apparatus 1 provides the touch function, the user may reduce the calibrated image 112 by performing a touch input.

Figure 5:
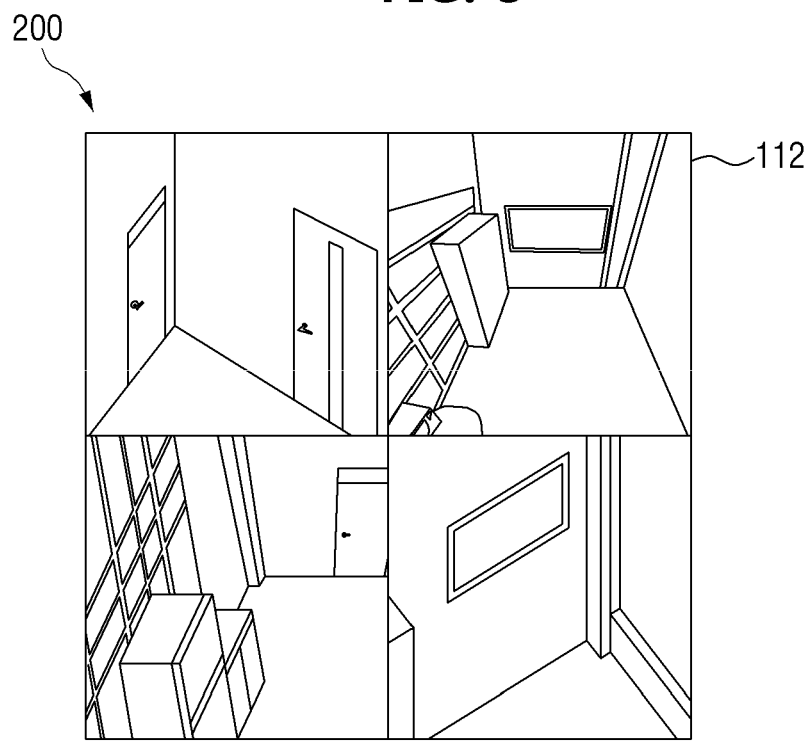
FIG. 5 is a view illustrating a state in which only calibrated images are displayed on a display, according to an embodiment.

FIG. 5 is a view illustrating a state in which only the calibrated images 112 are displayed on the screen 200 of the display 11 according to an embodiment.

The display 11 according to an embodiment provides a view mode in which only the calibrated images 112 are displayed. In the view mode in which only the calibrated images 112 are displayed, four separate images, which are four calibrated images 112, may be displayed on the screen 200 of the display 11 as illustrated in FIG. 5. However, the number of calibrated images 112 is not limited thereto, and as described above, various numbers of calibrated images 112 such as four separate images, six separate images, or nine separate images may be displayed. Although the case in which only the calibrated images 112 are displayed will be described below by assuming that the calibrated images 112 are four separate images, this is merely for convenience of description and is not intended to limit the scope.

Figure 6:
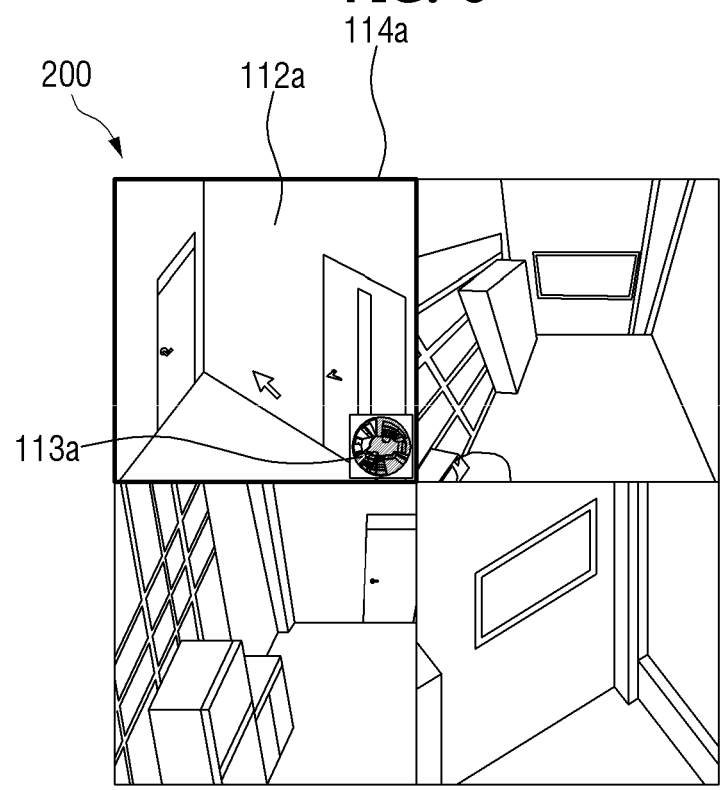
FIGS. 6 and 7 are views illustrating a state in which each of the plurality of calibrated images of FIG. 5 is selected, according to embodiments.
Figure 7:
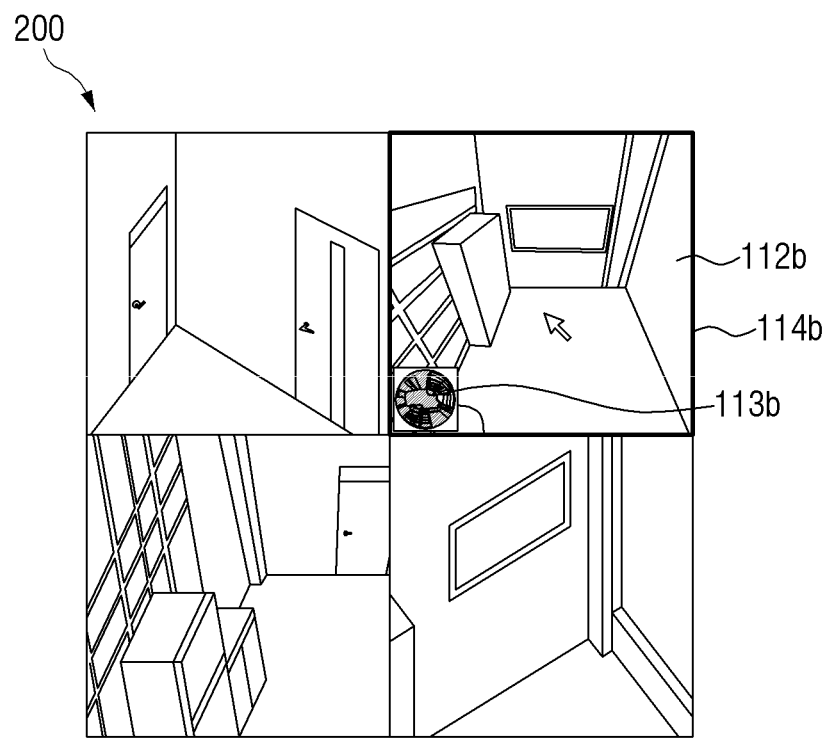

FIGS. 6 and 7 are views illustrating a state in which each of the plurality of calibrated images 112 of FIG. 5 is selected.

If the user selects a single calibrated image 112a among the plurality of calibrated images 112, a mini map 113 in which the original image 111 is roughly shown is displayed in the selected calibrated image 112a. In addition, a polygon 116 formed to surround the dewarping region 115 may be displayed in the original image 111 shown in the mini map 113. Therefore, by selecting the single calibrated image 112a, the user may simultaneously monitor the selected calibrated image 112a and the original image 111. The polygon 116 and the mini map 113 will be described in detail below.

If the user is able to input a command in the monitoring apparatus 1 through a mouse, the user may simply select the calibrated image 112a through a mouse-over. The mouse-over refers to simply placing a mouse cursor on a specific object without using a mouse button. However, embodiments are not limited thereto, and the calibrated image 112 may also be selected through a mouse click. If the monitoring apparatus 1 provides the touch function, the user may select the calibrated image 112a by "tapping" the calibrated image 112a using a finger. Here, "tapping," which is one of touch gestures, refers to shortly touching the display 11, and then, immediately releasing the touch. In this way, the mini map 113 may be displayed in the selected calibrated image 112a using only a simple operation such as a mouse-over or a click without complicated operations.

Meanwhile, if the user selects the calibrated image 112a, a border 114a as well as the mini map 113 may be displayed in the selected calibrated image 112a. The border 114a is formed in the form of a closed loop to surround a periphery of the selected calibrated image 112a. Therefore, the border 114a indicates the calibrated image 112a selected by the user among the plurality of calibrated images 112. In addition, although not illustrated in the drawings, the color of the border 114a surrounding the selected calibrated image 112a may vary. Further, the color of lines may be different for each polygon 116, and the color of a polygon 116 and the color of a border 114a of a selected calibrated image 112a corresponding to a dewarping region 115 that the polygon 116 surrounds may match. Using such a characteristic, the user may easily match the selected calibrated image 112a and the dewarping region 115 that the polygon 116 surrounds in the mini map 113 to each other. Particularly, when there are a plurality of calibrated images 112, in addition to simply recognizing a region to which a specific calibrated image 112a corresponds in the mini map 113, the user may easily identify which regions in the mini map 113 the plurality of calibrated images 112 are displaying and, accordingly, an extent to which a blind spot is present in the original image 111.

Referring to FIGS. 6 and 7, when a first calibrated image 112a is selected, a first mini map 113a is displayed at a lower end of a right side of the first calibrated image, and a first border 114a that surrounds the first calibrated image 112a is displayed as illustrated in FIG. 6. When a second calibrated image 112b is selected, a second mini map 113b is displayed at a lower end of a left side of the second calibrated image, and a second border 114b that surrounds the second calibrated image 112b is displayed as illustrated in FIG. 7. Although not illustrated in the drawings, like the cases of the first and second calibrated images 112a and 112b, when a third calibrated image 112c is selected, a third mini map 113c is displayed at an upper end of a right side of the third calibrated image, and a third border 114c that surrounds the third calibrated image 112c is displayed. When a fourth calibrated image 112d is selected, a fourth mini map 113d is displayed at an upper end of a left side of the fourth calibrated image, and a fourth border 114d that surrounds the fourth calibrated image 112d is displayed. That is, all of the mini maps 113 may be displayed around the center of the display 11 as a whole.

Through the above process, in the view mode in which the plurality of calibrated images 112 are displayed, the mini map 113 is displayed only for a single calibrated image 112 selected by the user among the plurality of calibrated images 112. That is, the mini map 113 is selectively displayed only for the selected calibrated image 112 for which the user desires to check the mini map 113. Therefore, even if the original image 111 is not separately displayed, the user may easily monitor the plurality of calibrated images 112. In addition, since the border 114 is displayed only for the calibrated image 112 selected by the user, the user may easily check which image has been selected.

However, the calibrated images 112 are not always four separate images as illustrated in FIGS. 6 and 7. That is, the calibrated images 112 may also be formed as various other numbers of images such as six separated images or nine separated images. Therefore, according to another embodiment, when each of the calibrated images 112 is selected, a mini map 113 is always displayed at a constant position in the selected calibrated image 112. For example, all of the mini maps 113 may be displayed at a lower end of a left side of each of the calibrated images 112. However, embodiments are not limited thereto, and the mini map 113 may be displayed at various other positions in the selected calibrated image 112.

Meanwhile, in the method in which the mini map 113 is displayed whenever a mouse-over is performed on any region among regions within a single calibrated image, the mini map 113 may be displayed even when the user does not want the original image 111. Therefore, according to another embodiment, even in a single calibrated image 112, the mini map 113 may be displayed only when a mouse-over is performed on a specific partial region. Here, the specific partial region is preferably but not necessarily a region in the vicinity of a region in which the mini map 113 will be displayed, and more preferably but not necessarily, may be a separate partial region including the mini map 113 among four separate regions obtained by dividing a single calibrated image 112 into four, in which two partial calibrated images 112 are present both horizontally and vertically.

Using the above method, the user may easily match a calibrated image 112 and a dewarping region 115 corresponding thereto to each other even if the number of the calibrated images 112 increases. In addition, even if the number of polygons 116 also increases as the number of calibrated images 112 increases, the user's viewing of the original image 111 may not be hindered by the numerous polygons 116.

Figure 8:
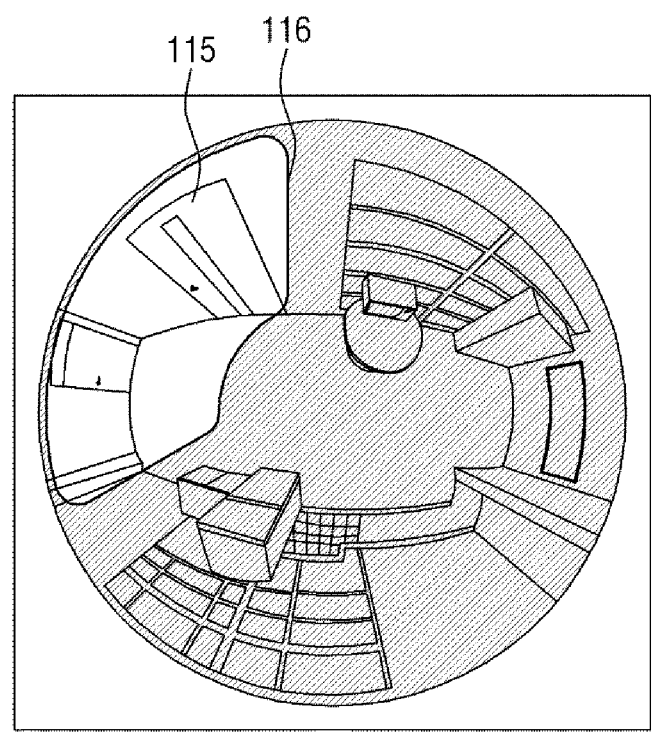
FIG. 8 is an enlarged view illustrating a mini map, which is displayed in the calibrated images in FIGS. 4, 6, and 7, in detail, according to an embodiment.

FIG. 8 is an enlarged view illustrating a mini map 113, which is displayed in the calibrated images 112 in FIGS. 4, 6, and 7, in detail.

As described above, in the view mode in which only the original image 111 is displayed, when the original image 111 is enlarged, the original image 111 is automatically dewarped to be a calibrated image 112, and a mini map 113 is displayed. In addition, in the view mode in which only the calibrated images 112 are displayed, when a single calibrated image 112 is selected among the plurality of calibrated images 112, a mini map 113 is displayed in the selected calibrated image 112. Such a mini map 113 is shown in detail in FIG. 8.

The mini map 113 roughly shows the original image 111. In addition, a polygon 116 which is formed to surround a dewarping region 115 may be displayed in the original image 111 shown in the mini map 113. The polygon 116 is formed in the form of a closed loop to surround the dewarping region 115 dewarped in the original image 111. Therefore, the user may recognize the boundary and range of the dewarping region 115.

Meanwhile, regions other than the dewarping region 115 in the original image 111 of the mini map 113 may be processed to be shaded. If the regions other than the dewarping region 115 are not shaded in the original image 111, it may be difficult for the user to immediately identify the boundary and range of the dewarping region 115 when the line of the polygon 116 is too thin. On the other hand, when the line of the polygon 116 is too thick, the user's viewing of the original image 111 may be hindered. However, if the regions other than the selected dewarping region 115 are shaded as illustrated in FIG. 8, it is easy for the user to immediately identify the boundary and range of the dewarping region 115. In addition, the shading is preferably but not necessarily, semi-transparent so that the user may easily view even the shaded regions in the original image 111.

According to another embodiment, only the selected dewarping region 115 displays the original image 111, and the other regions of the mini map 113 are set to be semi-transparent. Alternatively, the original image 111 itself may be semi-transparent, and the polygon may allow the dewarping region 115 to be distinguished by the user. Therefore, the user may monitor even a portion of a calibrated image 112 that is covered by the mini map 113.

Further, as illustrated in FIG. 8, an outline of the mini map 113 has a quadrilateral shape, and the original image 111 shown in the mini map 113 has a circular shape. Therefore, since the two shapes do not exactly match, a predetermined space may be generated between the outline of the mini map 113 and the original image 111. According to still another embodiment, such a predetermined space may also be formed to be transparent or semi-transparent so that the user's field of view related to the calibrated image 112 is further secured.

Figure 9:
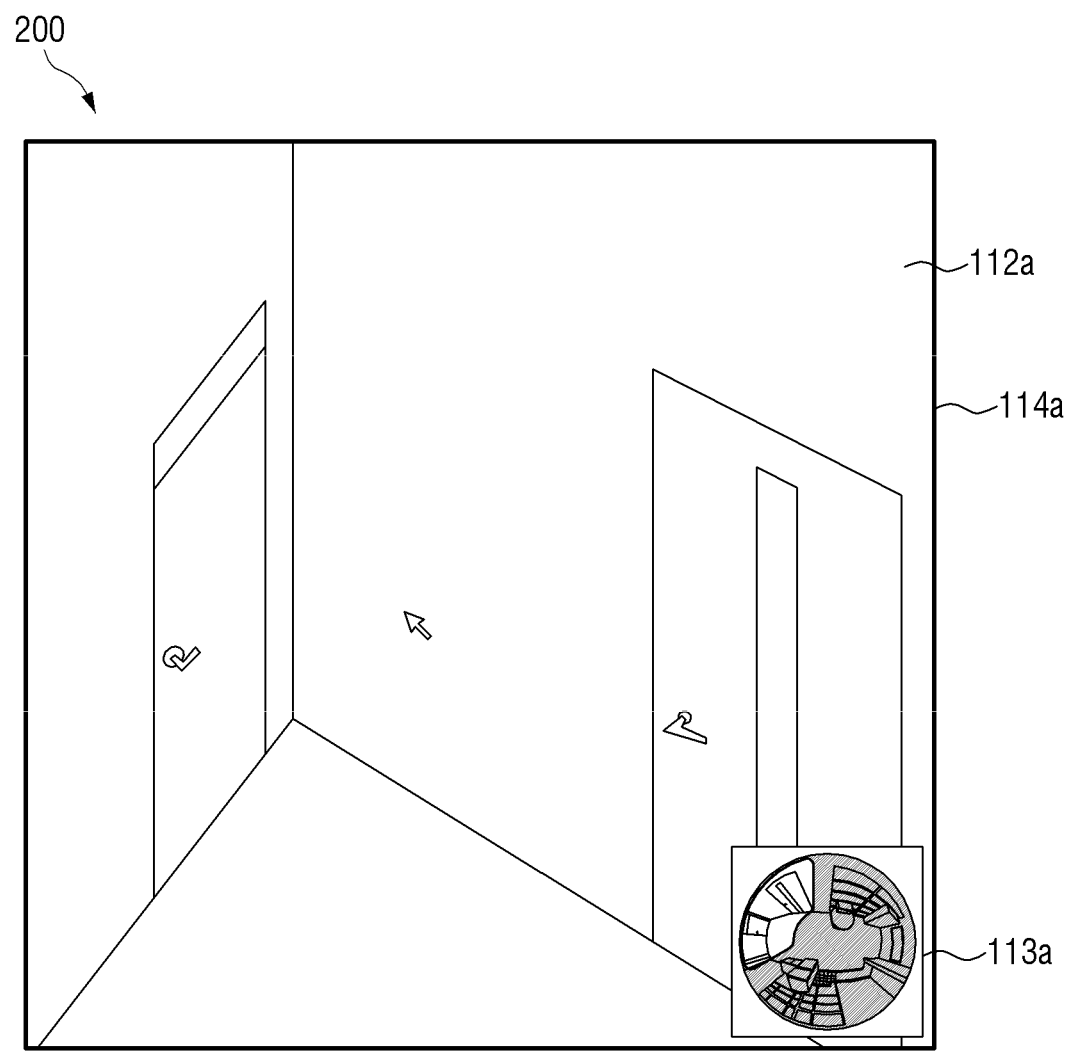
FIG. 9 is a view illustrating a state in which a first calibrated image of the calibrated images of FIGS. 6 and 7 is displayed in full view, according to an embodiment.

FIG. 9 is a view illustrating a state in which a first calibrated image 112a of the calibrated images 112 of FIGS. 6 and 7 is displayed in full view.

As described above, when an event occurs, the user performs monitoring with a greater focus on a calibrated image 112. Particularly, when the plurality of calibrated images 112 are present, the user performs monitoring with a greater focus on some of the calibrated images 112 that display a state in which the event has occurred. Therefore, some of the calibrated images 112 may have to be displayed after the size thereof is enlarged.

If the user is able to input a command in the monitoring apparatus 1 through a mouse, the user double-clicks the first calibrated image 112a among the plurality of calibrated images 112 using the mouse. Then, as illustrated in FIG. 9, the size of the first calibrated image 112a may be enlarged so that the first calibrated image 112a is displayed in full view on the screen 200 of the display 11 as a whole. If the monitoring apparatus 1 provides the touch function, the user may double-tap the first calibrated image 112a using a finger. In this way, the size of the first calibrated image 112a may be enlarged so that the first calibrated image 112a is displayed in full view on the screen 200 of the display 11 as a whole as illustrated in FIG. 9. Here, double-tapping, which is one of touch gestures, refers to quickly repeating tapping, in which the screen of the display 11 is shortly touched, and then, the touch is immediately released, two times.

Meanwhile, in the method or mode in which the mini map 113 is displayed whenever a mouse-over is performed on any region among regions within the first calibrated image 112a which is displayed in full view, the mini map 113 may be displayed even when the user does not want the original image 111. Therefore, according to another embodiment, even in the first calibrated image 112a which is displayed in full view, the mini map 113 may be displayed only when a mouse-over is performed on a specific partial region. Here, the specific partial region is preferably but not necessarily, a region in the vicinity of a region in which the mini map 113 will be displayed, and more preferably but not necessarily, may be a separate partial region including the mini map 113 among four separate regions obtained by dividing the first calibrated image 112a, which is displayed in full view, into four, in which two partial calibrated images are present both horizontally and vertically.

Figure 10:
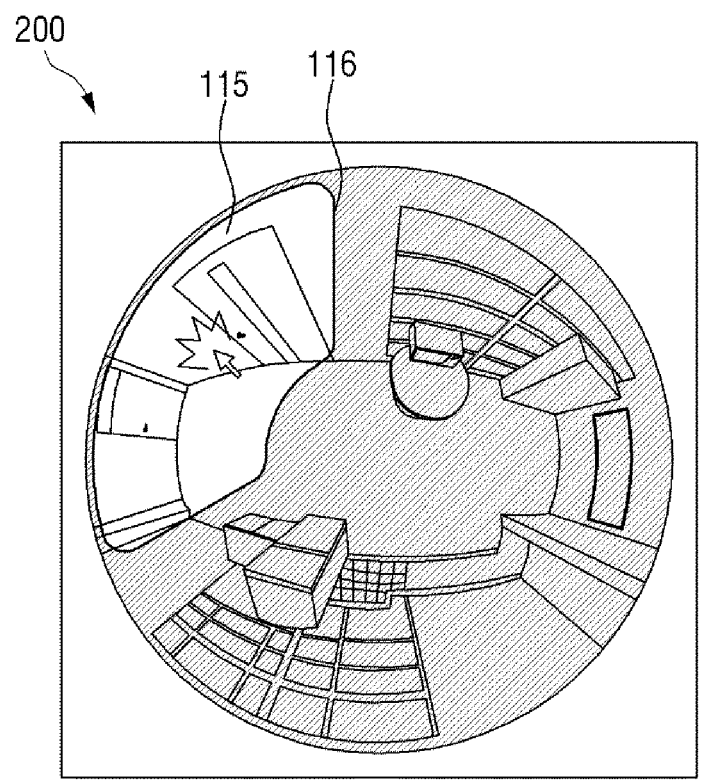
FIG. 10 is a view in which a dewarping region is selected to be dragged, according to an embodiment.

FIG. 10 is a view in which a dewarping region 115 is selected to be dragged according to an embodiment.

Dragging refers to pulling a specific object from one point to another point in order to move a specific object on a screen of a display.

In order to drag the dewarping region 115, a mouse click is performed on the dewarping region 115 as illustrated in FIG. 10, or a touch is made on the dewarping region 115 using a finger or the like. As described above, the polygon 116 is formed to surround the dewarping region 115 so that the user is allowed to recognize the range and boundary of the dewarping region 115.

Figure 11:
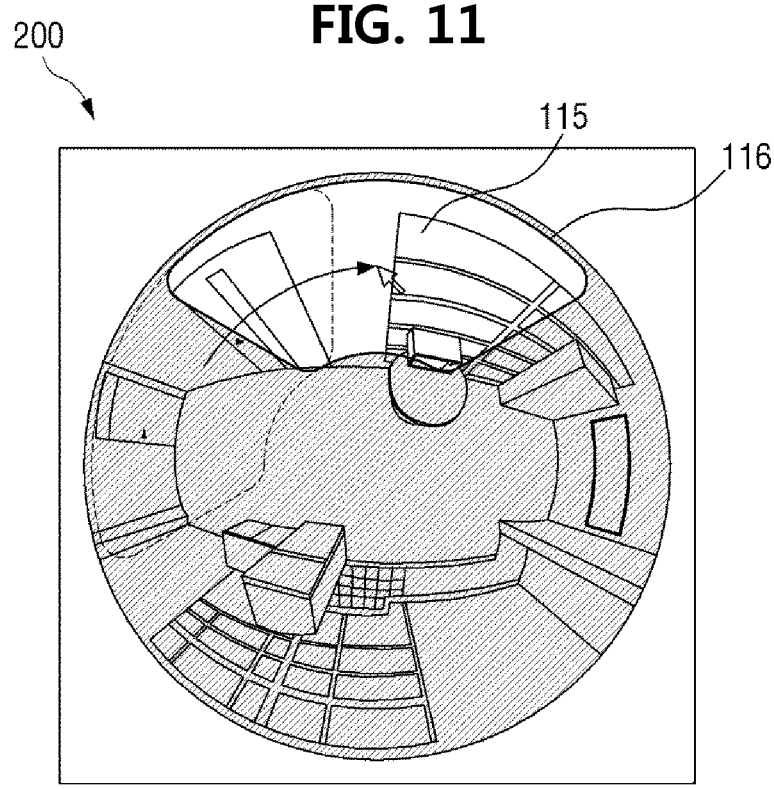
FIG. 11 is a view illustrating a state in which a dewarping region is dragged, according to an embodiment.
Figure 12:
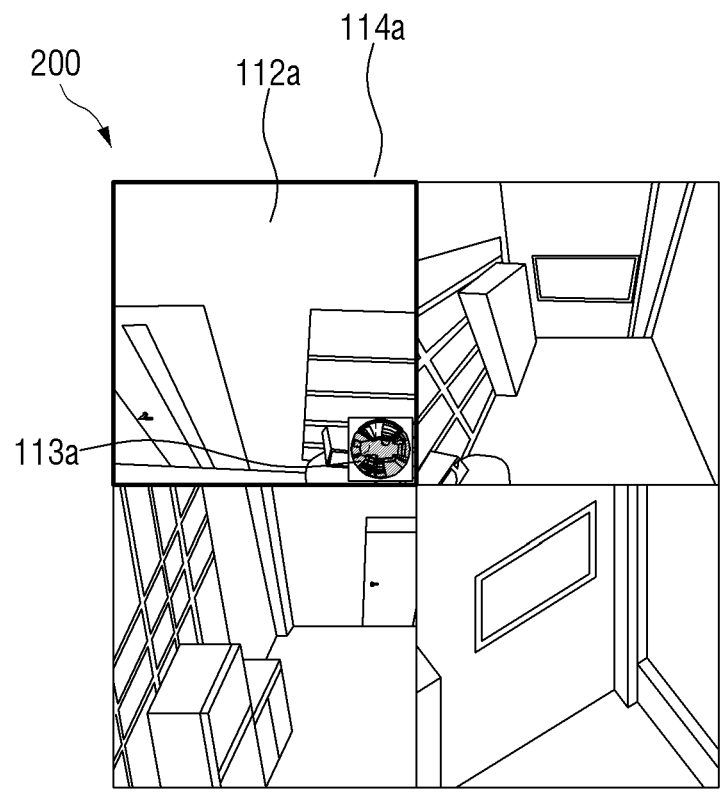
FIG. 12 is a view illustrating a state in which, due to the dewarping region being dragged in FIG. 11, a first calibrated image is panned or tilted, according to an embodiment.

FIG. 11 is a view illustrating a state in which the dewarping region 115 is dragged according to an embodiment, and FIG. 12 is a view illustrating a state in which, due to the dewarping region 115 being dragged in FIG. 11, the first calibrated image 112a is panned or tilted.

The user holds either the mouse click or the touch made using the finger or the like that is performed on the dewarping region 115. Then, as illustrated in FIG. 11, the user pulls the dewarping region 115 from one point to another point. Since the dewarping region 115 corresponds to a calibrated image 112, when the dewarping region 115 is dragged, the calibrated image 112 which corresponds thereto is also panned or tilted. Therefore, the first calibrated image 112a illustrated in FIG. 6 is panned to be a first calibrated image 112a illustrated in FIG. 12 due to the user's dragging of the dewarping region 115.

Meanwhile, although not illustrated in the drawings, the user may change a magnification of a calibrated image 112 by zooming in or zooming out.

If the user is able to input a command in the monitoring apparatus 1 through a mouse, the user may perform a mouse-over on a single calibrated image 112 of the plurality of calibrated images 112 using a mouse cursor of the mouse and zoom in or zoom out the calibrated image 112 by scrolling a mouse wheel upward or downward. Alternatively, if a plurality of separate menus is provided and the Enlarge menu or the Reduce menu is selected therefrom, the calibrated image 112 may be zoomed in or zoomed out each time the mouse is clicked.

If the monitoring apparatus 1 provides the touch function, the user may zoom in or zoom out the calibrated image 112 by performing a touch input.

Meanwhile, an area of the dewarping region 115 varies according to a magnification, i.e., a zoom value, of the calibrated image 112. The area of the dewarping region 115 decreases as the calibrated image 112 is more zoomed in, and the area of the dewarping region 115 increases as the calibrated image 112 is more zoomed out.

Figure 13:
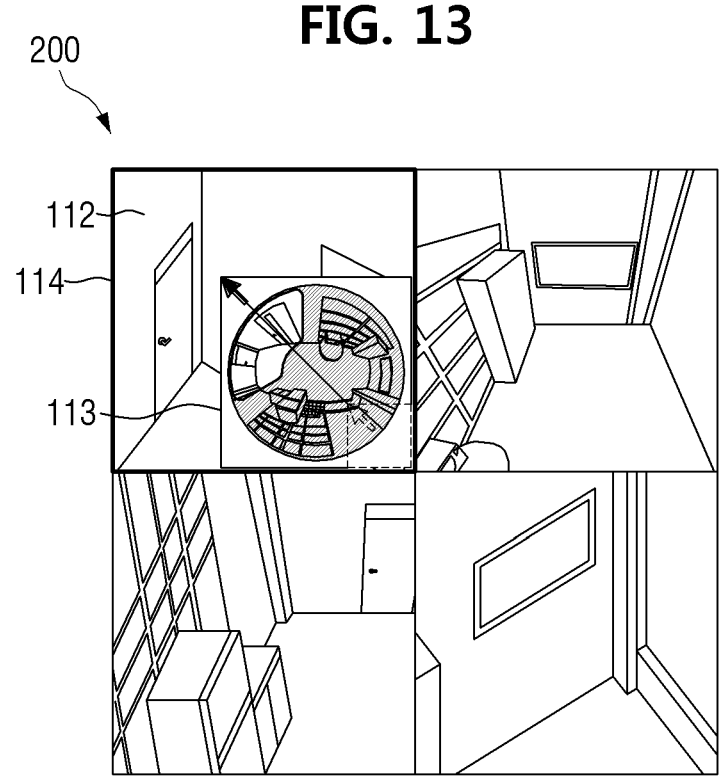
FIG. 13 is a view illustrating a state in which a mini map is enlarged, according to an embodiment.
Figure 14:
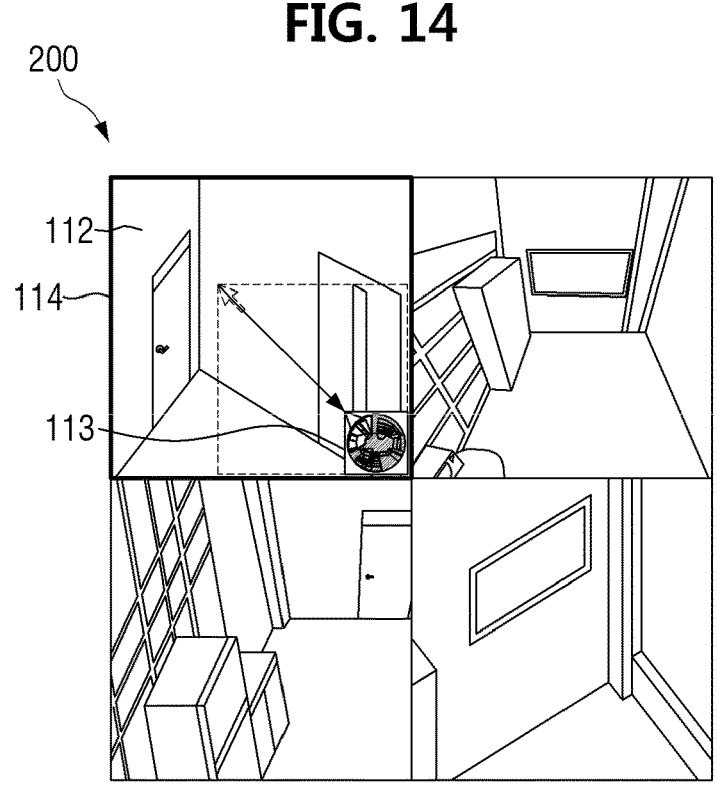
FIG. 14 is a view illustrating a state in which a mini map is reduced, according to an embodiment.

FIG. 13 is a view illustrating a state in which the mini map 113 is enlarged according to an embodiment, and FIG. 14 is a view illustrating a state in which the mini map 113 is reduced according to an embodiment.

As described above, since the original image 111 has a wide angle of view, when an event occurs, the original image 111 facilitates identification of a position at which the event has occurred. Therefore, when an event occurs, the user performs monitoring with a greater focus on the original image 111 rather than on the calibrated image 112 in some cases. Therefore, in such cases, the mini map 113 showing the original image 111 has to be displayed after the size thereof is enlarged. In addition, for the user to monitor the calibrated image 112 again after monitoring the original image 111 in detail by enlarging the size of the mini map 113, the size of the mini map 113 also has to be reduced to its previous size.

If the user is able to input a command in the monitoring apparatus 1 through a mouse, the user may enlarge the size of the mini map 113 as illustrated in FIG. 13 or reduce the size of the mini map 113 as illustrated in FIG. 14 by performing a mouse-over on a boundary of the mini map 113 and dragging the boundary of the mini map 113 using a mouse cursor. Alternatively, the user may enlarge or reduce the size of the mini map 113 by double-clicking the mini map 113 using the mouse.

If the monitoring apparatus 1 provides the touch function, the user may also enlarge or reduce the size of the mini map 113 by double-tapping the mini map 113. In this case, it is difficult to adjust the size of the mini map 113 to an exact size desired by the user when double-clicking is performed using the mouse or double-tapping is performed using a touch. In such a case, preferably but not necessarily, the mini map 113 is enlarged to a preset magnification.

In this case, it is difficult to adjust the size of the mini map 113 to the exact size desired by the user when double-clicking is performed using the mouse or double-tapping is performed using a touch. In such a case, preferably but not necessarily, the mini map 113 is reduced to a preset magnification.

When double-clicking or double-tapping is performed in a case in which the mini map 113 is currently reduced, the mini map 113 is enlarged to a preset magnification as illustrated in FIG. 13. In addition, when double-clicking or double-tapping is performed in a case in which the mini map 113 is currently enlarged, the mini map 113 is reduced to a preset magnification as illustrated in FIG. 14. Therefore, in such cases, two magnifications, an enlargement magnification and a reduction magnification, should have been preset.

Figure 15:
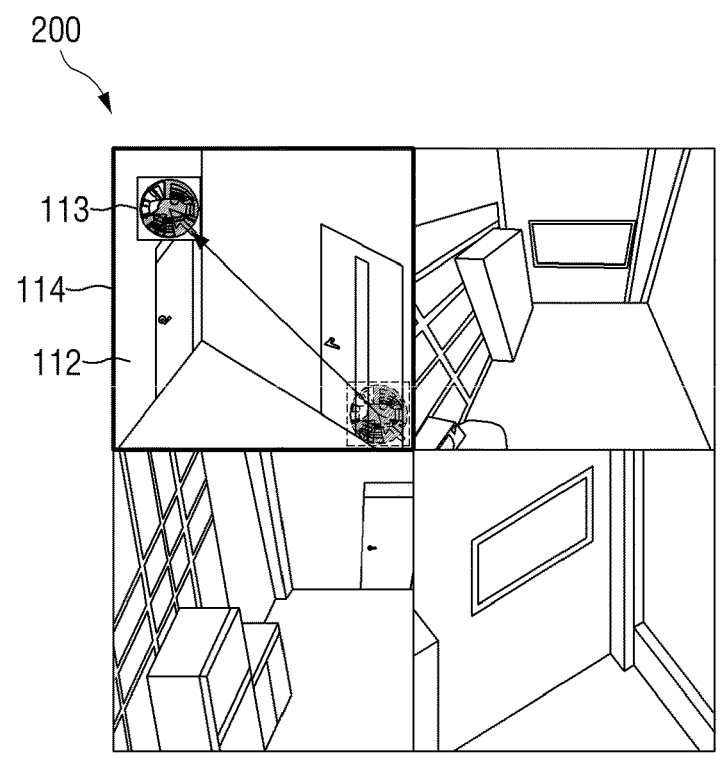
FIG. 15 is a view illustrating a state in which a mini map is moved, according to an embodiment.

FIG. 15 is a view illustrating a state in which the mini map 113 is moved according to an embodiment.

Even though the mini map 113 shows the original image 111, the mini map 113 may interfere with the field of view related to the calibrated image 112 since the mini map 113 is displayed in a portion of the calibrated image 112. Even if the original image 111 of the mini map 113 is formed to be semi-transparent, it is difficult to completely prevent interference with the field of view. Therefore, the user may also move the mini map 113 within the calibrated image 112 by dragging the mini map 113.

To drag the mini map 113, the user clicks the mini map 113 using a mouse or touches the mini map 113 using a finger or the like. Then, the user holds either the click on the mini map 113 using the mouse or the touch on the mini map 113 using the finger or the like. Then, as illustrated in FIG. 15, the user pulls the mini map 113 from one point to another point. When the mini map 113 is dragged, the mini map 113 is moved within the calibrated image 112 as illustrated in FIG. 15.

However, when the user moves the mini map 113, the user has to drag a portion other than the dewarping region 115 shown in the original image 111 of the mini map 113. This is because, if the user drags the dewarping region 115, the dewarping region 115 is moved, and thus, the calibrated image 112 is panned or tilted as described above.

Figure 16:
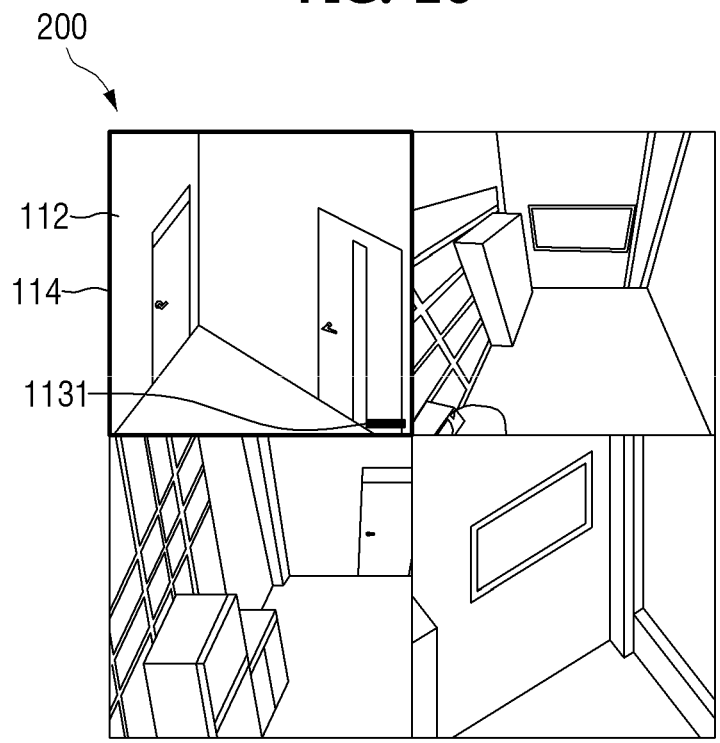
FIG. 16 is a view illustrating a state in which a mini map is minimized, according to an embodiment.

FIG. 16 is a view illustrating a state in which the mini map 113 is minimized according to an embodiment.

When an event occurs, the user identifies a position at which the event has occurred through the original image 111. Therefore, the display of the mini map 113 may not be required after the user checks the original image 111 and identifies the position at which the event has occurred.

As described above with reference to FIG. 14, the size of the mini map 113 may be reduced by the user performing a mouse-over on a boundary of the mini map 113 and dragging the boundary of the mini map 113 using a mouse cursor. In this case, according to an embodiment, when the size of the mini map 113 is reduced to a specific size or smaller, the mini map 113 is minimized automatically. When the size of the mini map 113 becomes smaller than the specific size, it is impossible for the user to monitor the original image 111 by visual inspection even if the mini map 113 is present. Therefore, when the user reduces the size of the mini map 113 to the specific size or smaller, the monitoring apparatus 1 determines that the user does not want the mini map 113 and minimizes the mini map 113. When the mini map 113 is minimized, a minimization icon 1131 is formed as illustrated in FIG. 16. In this way, the user may recognize the fact that the mini map 113 has been minimized.

The minimization icon 1131 is generated when the user only wants to monitor the calibrated image 112 without the mini map 113. Therefore, preferably but not necessarily, the size of the minimization icon 1131 is extremely small so that the minimization icon 1131 does not interfere with the user's field of view when the user monitors the calibrated image 112.

The user may want to monitor the original image 111 again through the mini map 113 after the mini map 113 is minimized. Therefore, to re-display the mini map 113 which has been minimized, the user double-clicks the minimization icon 1131. Then, the size of the mini map 113 returns to the size right before the mini map 113 was minimized.

Figure 17:
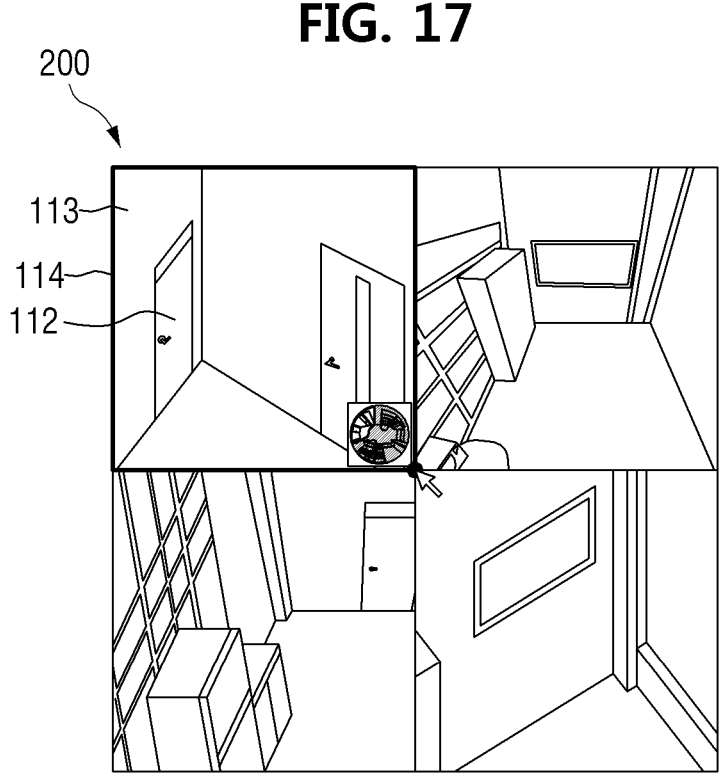
FIG. 17 is a view illustrating a state in which an intersection point of borders of a plurality of calibrated images is selected according to an embodiment.
Figure 18:
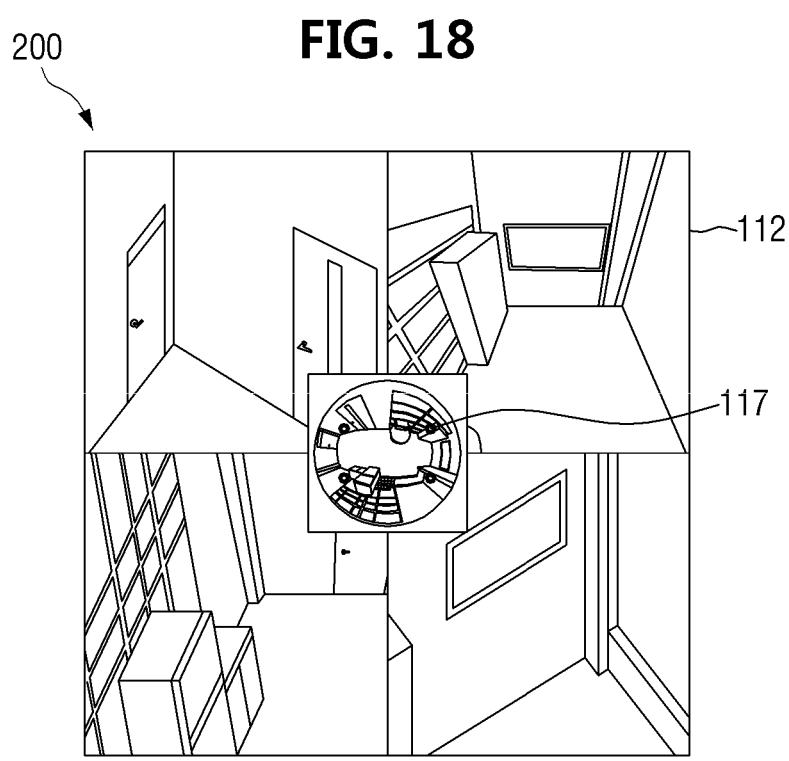
FIG. 18 is a view illustrating a state in which, as a result of an intersection point of borders of a plurality of calibrated images being selected in FIG. 17, an original image is displayed, according to an embodiment.

FIG. 17 is a view illustrating a state in which an intersection point of borders of the calibrated images 112 is selected according to an embodiment, and FIG. 18 is a view illustrating a state in which, as a result of the intersection point of the borders of the calibrated images 112 being selected in FIG. 17, the original image 111 is displayed.

Even though the mini map 113 shows the original image 111, the mini map 113 may interfere with the field of view related to the original image 111 since the original image 111 shown in the mini map 113 is processed to be shaded. Even if the shading is semi-transparent, it is difficult to completely prevent interference with the field of view. Therefore, there is a need for displaying an original image 111 without shading.

In the view mode in which only the calibrated images 112 are displayed, various numbers of calibrated images 112 may be displayed. In addition, when such calibrated images 112 meet each other, borders may be formed, and points at which the borders intersect with each other may be present.

First, the user may select an intersection point of borders of the calibrated images 112. If the user is able to input a command in the monitoring apparatus 1 through a mouse, preferably but not necessarily, the user selects the intersection point through a mouse-over. If the monitoring apparatus 1 provides the touch function, the user may also select the intersection point by tapping the intersection point using a finger. When the intersection point is selected, as illustrated in FIG. 18, the original image 111 may be displayed on the plurality of calibrated images 112. Since the original image 111 displayed in this case has a size larger than the original image 111 shown in the mini map 113 and does not include shading or a polygon 116 displayed therein, it is easy to secure the user's field of view.

As described above, the calibrated images 112 are not always four separate images. That is, the calibrated images 112 may also be formed as various other numbers of images such as six separated images or nine separated images. In addition, generally, four adjacent calibrated images 112 meet one another and form a single intersection point. When the calibrated images 112 are four separate images, if the four calibrated images 112 are arranged so that two calibrated images 112 are present both horizontally and vertically, a single intersection point of borders of the calibrated images 112 is formed as illustrated in FIG. 17. However, when the calibrated images 112 are six separate images, if the six calibrated images 112 are arranged so that three calibrated images 112 are present horizontally and two calibrated images 112 are present vertically, two intersection points of borders of the calibrated images 112 are formed. When a plurality of intersection points are formed as in this case, preferably but not necessarily, the original image 111 is displayed whenever any of the intersection points is selected.

Meanwhile, in the displayed original image 111, a guide icon 117, which is related to four adjacent calibrated images 112 which form an intersection point, may be displayed. The guide icon 117 is placed around the center of the dewarping region 115. The coordinates of the center of the dewarping region 115 may be obtained by approximately calculating the coordinates by using the width, height, and the like of the dewarping region 115 according to the shape in which the dewarping region 115 is formed.

By the guide icon 117 being located in the dewarping region 115, the user may recognize which region of the original image 111 the calibrated image 112 is displaying. However, since the polygon 116 is not displayed in the original image 111, the user may recognize only an approximate position of the dewarping region 115 and is unable to recognize the exact boundary or range of the dewarping region 115.

Since the number of calibrated images 112 and the number of dewarping regions 115 are the same, the number of guide icons 117 is also same as the number of calibrated images 112. In addition, preferably but not necessarily, the size of the guide icon 117 is extremely small as illustrated in FIG. 18 so that, even when a plurality of guide icons 117 are formed, the guide icons 117 do not interfere with the user's field of view related to the original image 111.

As described above, when a plurality of intersection points is formed, the original image 111 may be displayed whenever any of the intersection points is selected. However, the calibrated images 112 which are adjacent to form each intersection point are different from each other. In addition, since the guide icon 117 indicates the dewarping region 115, the guide icon 117 corresponds to each calibrated image 112. Therefore, when there is a plurality of intersection points, guide icons 117 may be displayed at different positions in the original images 111 which are displayed due to the intersection points being selected.

Those of ordinary skill in the art to which the embodiments pertain should understand that the embodiments may be practiced in other specific forms without changing the technical idea or essential features thereof. Therefore, the embodiments described above are illustrative in all aspects and should not be understood as limiting. The scope of the inventive concept is defined by the claims below rather than the detailed description given above, and all changes or modifications derived from the meaning and scope of the claims and their equivalents should be interpreted as belonging to the scope of the inventive concept.

What is claimed is:

1. A monitoring apparatus comprising:
a communication interface configured to receive an original image acquired by a camera;
a storage configured to store the original image;
a display configured to display the original image and a plurality of calibrated images obtained by dewarping the original image; and
a controller configured to control operations of the communication interface, the storage, and the display,
wherein the plurality of calibrated images are displayed together at the same time,
wherein, in response to a first calibrated image being selected among the plurality of calibrated images, the display is configured to overlay a mini map which shows a rough representation of the original image on the first calibrated image, and
wherein, in response to a second calibrated image being selected among the plurality of calibrated images, the display is configured to overlay the mini map on the second calibrated image and remove the mini map overlaid from the first calibrated image.

2. The monitoring apparatus of claim 1, wherein, in response to the original image being enlarged, the original image is automatically dewarped and displayed as one of the plurality of calibrated images, and the display displays the mini map on the one of the plurality of calibrated images.

3. The monitoring apparatus of claim 1, wherein a currently selected calibrated image among the plurality of calibrated images is visibly divided from the other calibrated images.

4. The monitoring apparatus of claim 1, wherein plurality of calibrated images are formed by dewarping the original image.

5. The monitoring apparatus of claim 4, wherein, when one of the plurality of calibrated images is selected among the plurality of calibrated images, the display is configured to display the mini map on the selected calibrated image.

6. The monitoring apparatus of claim 4, wherein, when an intersection point of borders of the plurality of calibrated images is selected, the display is configured to display the original image.

7. The monitoring apparatus of claim 6, wherein the display is configured to display guide icons corresponding to the plurality of calibrated images, which form the intersection point, in the original image.

8. The monitoring apparatus of claim 1, wherein the display is configured to display, in the original image shown in the mini map, a polygon indicating a dewarping region which is dewarped to be the selected first calibrated image.

9. The monitoring apparatus of claim 8, wherein the display processes a region other than the dewarping region to be shaded in the original image shown in the mini map.

10. The monitoring apparatus of claim 1, wherein, when the mini map is minimized, the display is configured to display a minimization icon.

11. A monitoring system comprising:
the camera of claim 1 configured to capture the original image, the camera being a fisheye camera; and
the monitoring apparatus of claim 1.

12. The monitoring system of claim 11, wherein the original image is an image captured using an angle of view greater than or equal to 180°.

13. The monitoring system of claim 11, wherein the camera is configured to dewarp the original image to generate the plurality of calibrated images.

14. A monitoring apparatus comprising:
a communication interface configured to receive an original image acquired by an omnidirectional camera having an angle of view greater than or equal to 180°; and
a controller configured to control a display to display the original image and at least one calibrated image obtained by dewarping the original image on a screen of the display in a plurality of view modes,
wherein the view modes comprise a first view mode in which the original image and the at least one calibrated image are displayed on the screen of the display at the same time,
wherein, in the original image displayed on the screen, a region of the original image, corresponding to the at least one calibrated image, is visibly divided from the other regions of the original image, wherein the view modes comprise a second view mode in which only the original image among the original image and the at least one calibrated image is displayed on the screen, and wherein, in the second view mode, in response to receiving a user input on the region of the original image, the controller controls the display to display an enlarged calibrated image of the region on the screen, and overlay a mini map of the original image which is a reduced original image on the enlarged calibrated image.

15. The monitoring apparatus of claim 14, wherein, in the mini map, the region is visibly divided from the other regions of the original image.

16. The monitoring apparatus of claim 15, wherein, in response to another input of the user in the first view mode or the second view mode, another region of the original image is visibly divided from the other regions of the original image.

17. The monitoring apparatus of claim 14, wherein the view modes comprise a third view mode in which only the at least one calibrated image among the original image and the at least one calibrated image is displayed on the screen, wherein the at least one calibrated image is a plurality of calibrated images respectively showing respective regions of the original image, wherein, in the third view mode, in response to a user input selecting one of the plurality of calibrated images, the selected calibrated image is visibly indicated among the plurality of calibrated images.

18. The monitoring apparatus of claim 17, wherein, in the third view mode, a mini map of the original image which is a reduced original image is overlaid on the selected calibrated image, in response to the user input selecting the selected calibrated image.

19. The monitoring apparatus of claim 18, wherein in the first view mode or the third view mode, in response to another input of a user on the selected calibrated image, the selected calibrated image is displayed in full view on the screen along with the mini map.

\* \* \* \* \*